Figure 1:
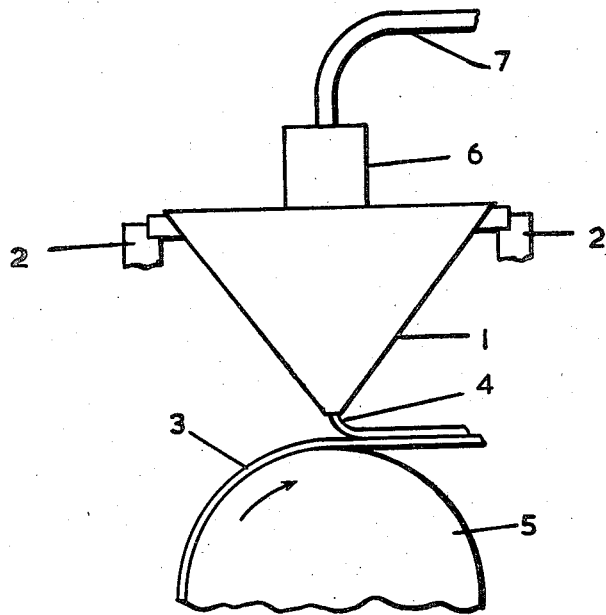

March 24, 1959  R. S. LOCKE  2,878,522
PROCESS FOR PRODUCING UNIFORM ROLLS OF FILM
Filed Sept. 28, 1956

INVENTOR
Ronald Stanley Locke

BY Felix Klass + Abner Sheffer
ATTORNEYS

United States Patent Office 2,878,522
Patented Mar. 24, 1959

2,878,522
PROCESS FOR PRODUCING UNIFORM ROLLS OF FILM

Ronald Stanley Locke, Spondon, England, assignor to British Celanese Limited, a corporation of Great Britain Application September 28, 1956, Serial No. 612,777

Claims priority, application Great Britain April 12, 1956

4 Claims. (Cl. 18—57)

This invention relates to film casting and especially to the casting of films of cellulose acetate or other organic film-forming material on to a moving casting surface, e.g., that of a drum or endless belt.

Thin films of cellulose acetate are commonly made by feeding a solution of cellulose acetate in volatile solvent to a hopper having an outlet in the form of a slot of controllable width, extruding the solution (the so called "dope") through the slot on to the surface of a moving endless metal band, evaporating the solvent from the layer of film supported by the band during the further travel of the band through an evaporative atmosphere, stripping the film from the band while it still contains solvent, substantially completing the evaporation of solvent from the film during a further run through an evaporative atmosphere, and reeling up the film.

In this method, every effort is made to control the width of the slot through which the dope is extruded so that the layer of dope extruded is uniform in thickness across its width. Nevertheless, minute variations in the thickness of this layer of dope are inevitable. The resulting thickness variations of the film may amount to not more than a few hundred thousandths of an inch, and may in no way affect the acceptability of the film (e.g., for such purposes as wrapping, and providing protective coverings for documents). When the film is reeled up, however, the areas of greater thickness ("high spots") in successive layers tend to register and I have found that this accounts for an unsightly appearance in the spool of film. This may take the form merely of alternating bright and dark circumferential bands due to optical interference and/or there may be bands due to optical interference and/or distortion in the visible regions of increased diameter or distortion in the spool. I have now found that this undesirable effect can be substantially avoided by providing slight and slow transverse relative movement between the orifice from which the dope is extruded and the take-up roll, i.e., the roll on which the film is spooled.

The present invention, therefore, contemplates a process for making film by a method in which an organic film-forming material in a fluid condition is extruded from a casting hopper on to a moving surface and hardened on said surface, and in which slight variations in thickness across the width of the film tend to occur, wherein transverse relative movement is provided between said hopper and said surface.

According to one method of carrying out the invention, the casting hopper is traversed slowly and to a slight extent, preferably continuously, across the direction of travel of the film during casting. By this means the registration of high spots in successive layers wound on to the take-up reel is avoided and a spool more nearly uniform in diameter along its length (i.e., perpendicular to the film length) is obtained. By a high spot is meant a longitudinal land in the upper surface of the film. If a transverse line across the film be imagined at a distance above the lower surface of the film equal to the average thickness of the film then the width of a high spot may be taken as the distance along this line between the two points at which it cuts the edges of the land.

Apparatus for carrying out the process comprises a hopper, a moving surface, means for traversing said hopper at right angles to the direction of travel of said surface, and means for supplying the film-forming material at a uniform rate to the hopper.

Figure 2:
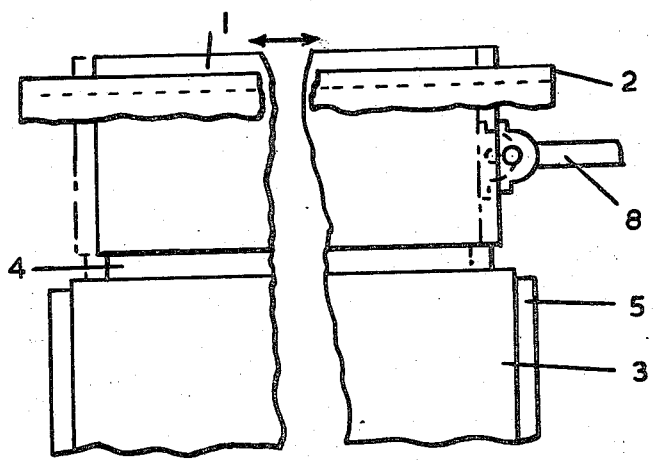

One form of apparatus for carrying out the process is shown by way of example in the accompanying drawings in which:

Figure 1 is an end elevation; and
Figure 2 is a plan.

Referring to the drawing: a hopper 1 is mounted on guides 2 for reciprocating movement which is imparted by a rod 8 operated by an eccentric (not shown). The hopper 1 is mounted above a film casting band 3, on to which a layer of dope 4 is extruded. The band 3 passes round an idler drum 5. A pump 6 feeds the dope to the hopper 1 and is connected to the supply means for the dope (not shown) by a flexible connection 7.

The extent of the traverse should be greater than the width of any high spot and preferably several (e.g., 3 to 5) times or many times (e.g., 5 to 10 times) that width. The effect of the traverse is, of course, to cause each land, instead of running parallel to the film length, to incline first towards one edge of the film and then towards the other, the pattern so produced repeating itself after each cycle of the traversing movement. The period of the traverse should be so long that between successive layers on the spool on which the lands register or nearly register there are many intervening layers. The half-period of the traverse may be the same in both directions (the motion may, for example, be a simple harmonic one) or there may be a slow traverse in one direction followed by a quick return. As the time taken to build up successive layers on the reel increases progressively during the building up of the spool, the rate of traverse may be progressively varied. The effect of the traverse is to produce a scalloped edge in the film being cast and this must be trimmed off to give a film of uniform width. The greater the extent of traverse the deeper will be the scallops and the greater the width that must be trimmed from both edges of the film. It is, therefore, desirable to traverse to the minimum extent that is adequate to achieve the desired approximation to uniform spool diameter. I have found that in casting a film of thickness between 0.5 and 2 mils and 25 to 50" wide at a speed of 40 to 150 ft./minute, a valuable improvement in the appearance and approximation to uniformity of diameter of the spool can be effected by traversing the dope hopper to the extent of 0.25 to 1.5" each way, at right angles to the direction of travel of the film, in the course of 5 to 15 minutes and trimming off the scalloped edges of the film during its travel to the spool after the film has been dried.

To enable the desired traverse to be effected the dope hopper is slidably supported on suitable transverse guide members. Various means of effecting the traverse are available. With a heavy dope hopper such as is employed in casting film of the width specified, I have found that the traverse is suitably provided by a rod pivotably attached to one side of the dope hopper and operated by an eccentric. An alternative method, is to employ a rod reciprocated by a pneumatic or hydraulic piston. Screw reciprocating mechanism may also be employed. Cam mechanism may be employed especially on casting hoppers of lighter weight, such as are used in casting narrower film. The supply of dope at a uniform rate to the casting hopper must not be interrupted or disturbed by movement of the hopper. I have found it advantageous to feed the hopper from a metering pump mounted on the hopper, and supplied by means of a flexible connection from the dope supply means. The trimming of the edges of the film is conveniently effected (by means of stationary or rotating knives) at the conclusion of drying, just before batching.

The preferred process according to the invention comprises feeding a solution of cellulose acetate in a volatile solvent at a uniform rate to a hopper having an outlet in the form of a slot of controllable width, extruding the solution through said slot on to the surface of a moving endless metal band while continuously traversing the hopper slowly and to a slight extent in a direction at right angles to that of said band, the supply of dope to the hopper at a uniform rate being uninterrupted by the movement thereof, evaporating the solvent from the layer of film supported by the band during further travel of the band through an evaporative atmosphere, stripping the film from the band while it still contains solvent, substantially completing the evaporation of solvent from the film during a further run through an evaporative atmosphere, trimming the film at the conclusion of drying and reeling up the film.

The following example illustrates the invention.

*Example*

Film of average thickness 1 mil and width 45" was cast from a 25% solution in acetone of cellulose acetate plasticised with 25% of its weight of diethyl phthalate. The dope was extruded on to a metal band travelling at 80 ft./minute from a hopper mounted on transverse guides above the band and reciprocated by 1" on each side of its mean position the period for a complete cycle being 10 minutes.

At the end of its travel on the band the film was stripped therefrom by a stripping roll and carried into a drying cabinet in passing through which drying was completed. The film was then carried past a pair of stationary trimming knives, which trimmed back the edges of the film to a region in which the width was uniform and the thickness across the width did not vary by more than ±5%.

The dried film was continuously wound up into a spool at a substantially constant linear speed.

The appearance and regularity of the spool which was of 4" internal diameter and contained some 3000 layers was much superior to one produced in the same way but without traversing the hopper.

In an alternative method the hopper is kept stationary, the spool is traversed and is trimmed to a uniform width of film after completion of the spooling operation.

The invention has been described with particular reference to the casting of films of cellulose acetate by the evaporative method on a moving band. It will be appreciated, however, that the method is applicable in other methods of casting films of organic film-forming material. Thus, for example the method may be applied to the casting of films on to a wheel rather than a band. Instead of cellulose acetate other film-forming organic materials may be employed, e.g., other organic substitution products of cellulose, especially other cellulose esters of paraffinic monocarboxylic acids containing 2 to 4 carbon atoms such as cellulose propionate, cellulose butyrate, cellulose acetate propionate and cellulose acetate butyrate, film-forming polyvinyl- and polyvinylidene compounds such as polyvinyl chloride, polyvinyl chlorideacetate, copolymers of vinyl chloride or vinylidene chloride with acrylonitrile or methacrylonitrile and copolymers of vinyl chloride with vinylidene chloride. Although of particular importance in forming films by the evaporative process, the method of the invention is also applicable to other methods of forming film by casting on to a moving surface. Thus for instance, it may be employed in the wet casting of films and in the processes in which a film-forming material in substantially molten condition is extruded on to a moving film-forming surface. Film-forming material from which films are made in this way include: polythene, the nylons and polyesters such as polyethylene terephthalate.

The method of the invention is of particular advantage in the production of thin films, i.e., films of thickness up to about 10 mils, e.g., 0.5 to 5 mils. It is applicable, however, quite generally in the manufacture of films sufficiently thin to be wound on to a reel.

Having described my invention, what I desire to secure by Letters Patent is:

1. Process for making film by a method in which a thin stream of organic film-forming material is extruded from a casting hopper on to a moving surface and hardened on said surface which comprises feeding a solution of cellulose acetate in a volatile solvent at a uniform rate to a hopper having an outlet in the form of a slot of controllable width, extruding the solution through said slot on to the surface of a moving endless metal band while continuously reciprocating the hopper slowly and to a slight extent in a direction at right angles to that of said band, the supply of dope to the hopper at a uniform rate being uninterrupted by the movement thereof, evaporating the solvent from the layer of film supported by the band during further travel of the band through an evaporative atmosphere, stripping the film from the band while it still contains solvent, substantially completing the evaporation of solvent from the film during a further run through an evaporative atmosphere, trimming the film at the conclusion of drying and reeling up the film.

2. Process according to claim 1, wherein the film, having a thickness of 0.5–2 mils and a width of 25–50 ins., is cast at a speed of 40–150 ft./min. and the hopper is reciprocated, to the extent of 0.25 to 1.5 inches on each side of the mean position of said hopper, at right angles to the direction of travel of the film, in the course of 5–15 minutes.

3. In a process for making film by extruding a thin stream of organic film-forming material from a casting hopper to a moving surface, hardening the layer of film-forming material on that surface, and stripping it therefrom, the step of maintaining a to-and-fro sideways movement of said stream relative to said surface, the range of said movement being but a small fraction of the width of the stream and the speed of said movement being but a small fraction of the forward speed of the stream.

4. Process according to claim 3, wherein the range of sideways movement amounts to 1–6% of the width of the stream and in the time taken to execute one complete to-and-fro movement, at least 200 feet of film have been formed on said surface.

References Cited in the file of this patent

UNITED STATES PATENTS

| | | |
|---|---|---|
| 983,743 | Mertens | Feb. 7, 1911 |
| 1,182,982 | Crump | May 16, 1916 |
| 2,762,077 | Markowitz | Sept. 11, 1956 |